United States Patent
Childress

(10) Patent No.: US 6,691,466 B2
(45) Date of Patent: Feb. 17, 2004

(54) CONCEALED DOOR AND DOOR JAMB REINFORCEMENT ASSEMBLY

(76) Inventor: Hollice C. Childress, 820 S. Braintree, Schaumburg, IL (US) 60193

( * ) Notice: Subject to any disclaimer, the term of this patent is extended or adjusted under 35 U.S.C. 154(b) by 138 days.

(21) Appl. No.: 09/927,849

(22) Filed: Aug. 10, 2001

(65) Prior Publication Data

US 2003/0029093 A1 Feb. 13, 2003

(51) Int. Cl.⁷ ............................. E05F 7/00; E05B 1/00
(52) U.S. Cl. ..................................... 49/462; 49/460
(58) Field of Search ........................ 49/462, 460, 504, 49/503, 501, 505; 70/416–418; 292/337, 340, 346, DIG. 2; 52/455, 800.13, 204.1, 800.12, 800.1, 801.11, 801.12, 656.4

(56) References Cited

U.S. PATENT DOCUMENTS

| | | | |
|---|---|---|---|
| 1,587,771 A | * 6/1926 | Goddard | 49/503 |
| 1,793,081 A | * 2/1931 | Goddard | 49/503 X |
| RE24,558 E | * 10/1958 | Tyree | 52/800.13 X |
| 3,271,919 A | * 9/1966 | Olton | 52/800.13 |
| 3,834,101 A | * 9/1974 | Wilder et al. | 52/309 |
| 4,416,087 A | 11/1983 | Ghatak | |
| 4,690,445 A | 9/1987 | Hartley | |
| 4,717,185 A | * 1/1988 | Hartley | 292/346 X |
| 4,720,129 A | 1/1988 | Bouchard | |
| 4,854,621 A | 8/1989 | Baldwin | |
| 4,858,384 A | 8/1989 | Blankenship | |
| 5,070,650 A | * 12/1991 | Anderson | 49/460 |
| 5,076,626 A | * 12/1991 | Tiddy et al. | 292/337 |
| 5,214,880 A | 6/1993 | Woodruff et al. | |
| 5,236,392 A | * 8/1993 | Fauciglietti | 52/455 |
| 5,241,790 A | 9/1993 | Schimpf | |
| 5,417,029 A | * 5/1995 | Hugus et al. | 49/501 X |
| 5,581,948 A | 12/1996 | Simonsen | |
| 5,586,796 A | * 12/1996 | Fraser | 292/346 |
| 5,644,870 A | * 7/1997 | Chen | 49/501 |
| 5,836,628 A | * 11/1998 | Beier | 49/462 X |
| 5,934,030 A | * 8/1999 | McDonald | 52/204.1 |
| 6,418,669 B1 | * 7/2002 | Suter | 49/462 |

* cited by examiner

*Primary Examiner*—Hugh B. Thompson
(74) *Attorney, Agent, or Firm*—Pauley Petersen & Erickson

(57) ABSTRACT

A reinforcement assembly for reinforcing a door and door jamb in the vicinity of a door lock aperture in a door frame comprising a wedge shaped rigid plate attached to an inner surface of the door jamb so that the plate is concealed from view. The plate has at least one aperture for receiving the latch and at least one flute along the face of the width of the plate allowing epoxy to be placed between the plate and the door jamb. A U shaped member fit within the free end of a door so that the member is substantially flush with the surface of the free end of the door and concealed from view from the front and the back face of the door. The U shaped member has at least one aperture to allow the latch to pass through the member.

21 Claims, 4 Drawing Sheets

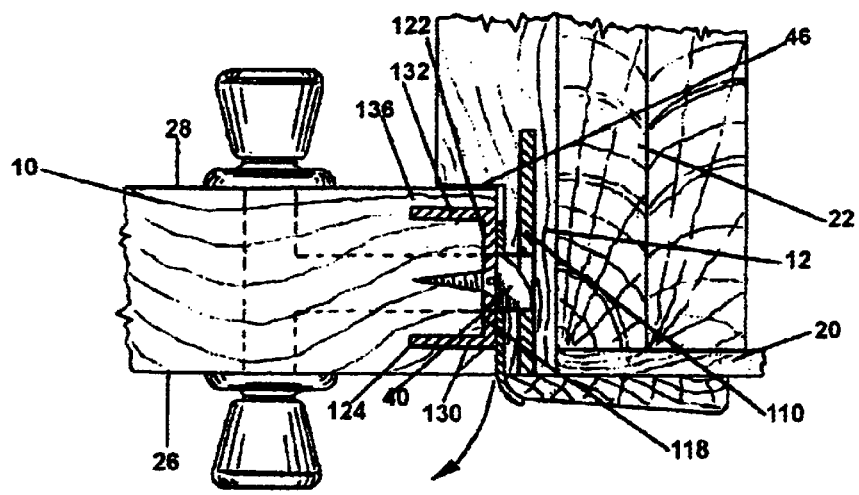
*Fig. 2*
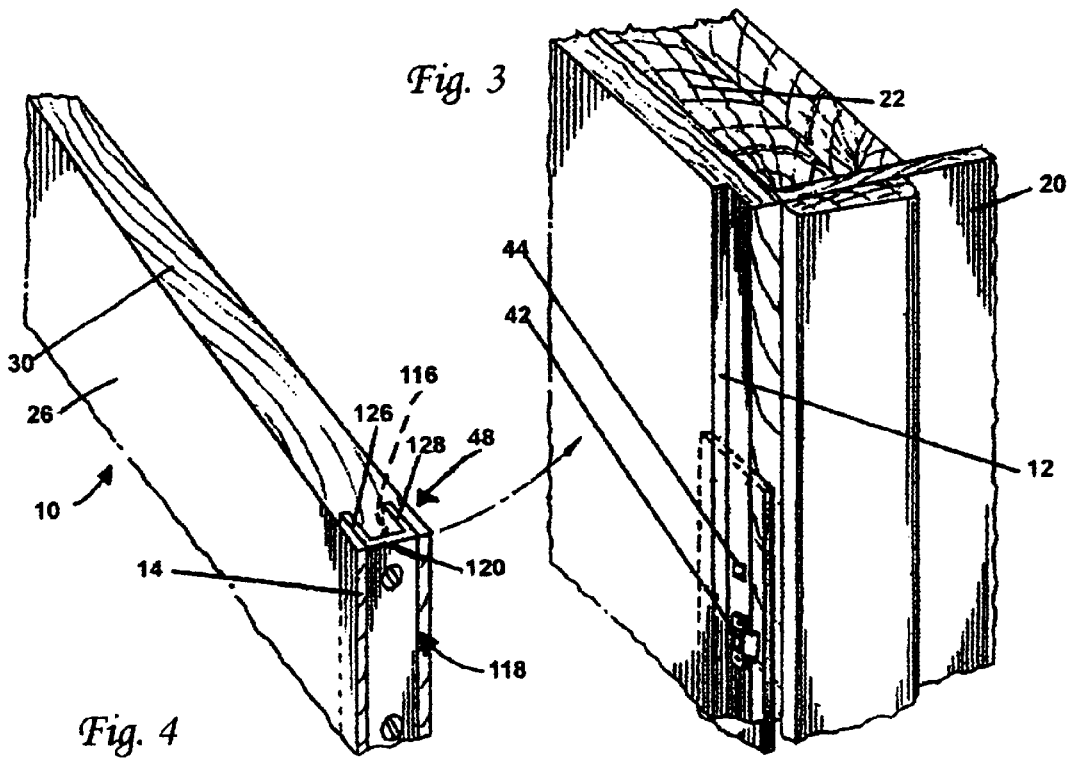
*Fig. 3*
*Fig. 4*

US 6,691,466 B2

CONCEALED DOOR AND DOOR JAMB REINFORCEMENT ASSEMBLY

BACKGROUND OF THE INVENTION

1. Field of the Invention

The claimed invention relates to the reinforcement of doors and door jambs, and more specifically to an assembly that provides concealed reinforcement to the free end of a door and to the door jamb.

2. Description of the Prior Art

Reinforcing doors and doorways to prevent unauthorized entry has been common place for many years. In constructing such reinforcements, obtrusive methods of using metal plates to reinforce wooden doors and door jambs have been used with little attempt at minimizing the appearance of such reinforcements. The following United States patents illustrate several of these devices.

U.S. Pat. No. 4,416,087 issued to Ghatak discloses a door jamb reinforcer comprising reinforcing rods which are positioned internally along the depth of a door jamb adjacent the area of the bolt receiver or striker plate. The reinforcing rods increase the door jamb's shear and tensile strength by preventing the jamb from splintering during an attempted forced entry. The door jamb reinforcer is hidden within the door jamb, but does not provide reinforcement to the door. With this in mind, the entrance is still susceptible to forced entry by compromising the door's edge.

U.S. Pat. No. 4,720,129 issued to Bouchard discloses a combination security plate for attachment to a door edge over or in conjunction with a latch set, the security plate providing protection against incursion of a credit card or other light burglary tool directed to the latch or to destruction of the latch area of the door or door stop. This two piece security plate provides reinforcement to the door and door jamb, but does so by compromising the appearance of the entryway.

U.S. Pat. No. 4,854,621 issued to Baldwin discloses a door security assembly comprising a generally U-shaped striker plate member for fitting transversely around one side edge of a door frame and having a first arm for facing into the door opening having an opening for receiving a door latch, and a second, parallel arm for fitting between the door frame and the surrounding doorway in the wall. The assembly provides reinforcement to the door jamb by covering a portion of the door frame with metal plating in a way that compromises the appearance of the door entry. However, the assembly does not provide reinforcement to the door's edge.

U.S. Pat. No. 5,214,880 issued to Woodruff et al. discloses a door edge construction having an elongated side extrusion attached to the edge of a door. A side cap having a U shaped cross-section is fitted over the side member and over the edges of the door so as to hide them from view. The U shaped construction provides the door edge with a reinforced edge, but does so by introducing a metal side cap that is not aesthetically pleasing.

U.S. Pat. No. 5,241,790 issued to Schimpf discloses a reinforcing plate for reinforcing a door jamb to prevent break-ins and particularly kick-ins of the door by unauthorized persons. The assembly is hidden within the door jamb, but the assembly does not provide reinforcement to the door's edge. Since the door's edge is not reinforced, the entrance is still vulnerable to forced entry by shattering the door's edge.

While these devices provide satisfactory reinforcement to doors and door jambs, there still remains a need for an assembly that provides reinforcement to a door's edge and the door jamb while being concealed so that such reinforcement does not detract from the appearance of the door entryway.

SUMMARY OF THE INVENTION

Accordingly, it is the object of the claimed invention to provide an assembly that reinforces the door edge and the door jamb of a common doorway in a way that conceals such reinforcement.

This object is accomplished by providing a concealed door and door jamb reinforcement assembly that reinforces the door jamb within the door frame and reinforces the door within the door's edge. The door jamb is reinforced by inserting a plate between the structural elements of a wall and the doorway's door jamb to prevent the door frame from being compromised by forced entry. The door is reinforced by inserting a U shaped member within the door's edge to prevent the door from being compromised by forced entry.

The assembly comprises a wedge shaped rigid plate attached to an inner surface the door jamb so that the plate is concealed from view. The plate has at least one aperture for receiving the latch of a door lock set and has at least one flute along the face of the width of the plate to allow epoxy to be placed between the plate and the door jamb.

The assembly further comprises a U shaped member sized and shaped to fit within a U shaped channel cut into the free end of a door so that the U shaped member is substantially flush with the surface of the free end of the door so that the U shaped member is concealed from view from the front face and the back face of the door. The U shaped member has at least one aperture to allow the latch of a door lock set to pass through the U shaped member.

BRIEF DESCRIPTION OF THE DRAWINGS

FIG. 2 is a top view of a door and doorway with the concealed door and door jamb reinforcement assembly installed.

FIG. 3 is a perspective view with the rigid plate shown in hidden lines.

FIG. 4 is a perspective view with the branches of the U shaped member shown in hidden lines.

DETAILED DESCRIPTION OF THE PREFERRED EMBODIMENT

Figure 1:
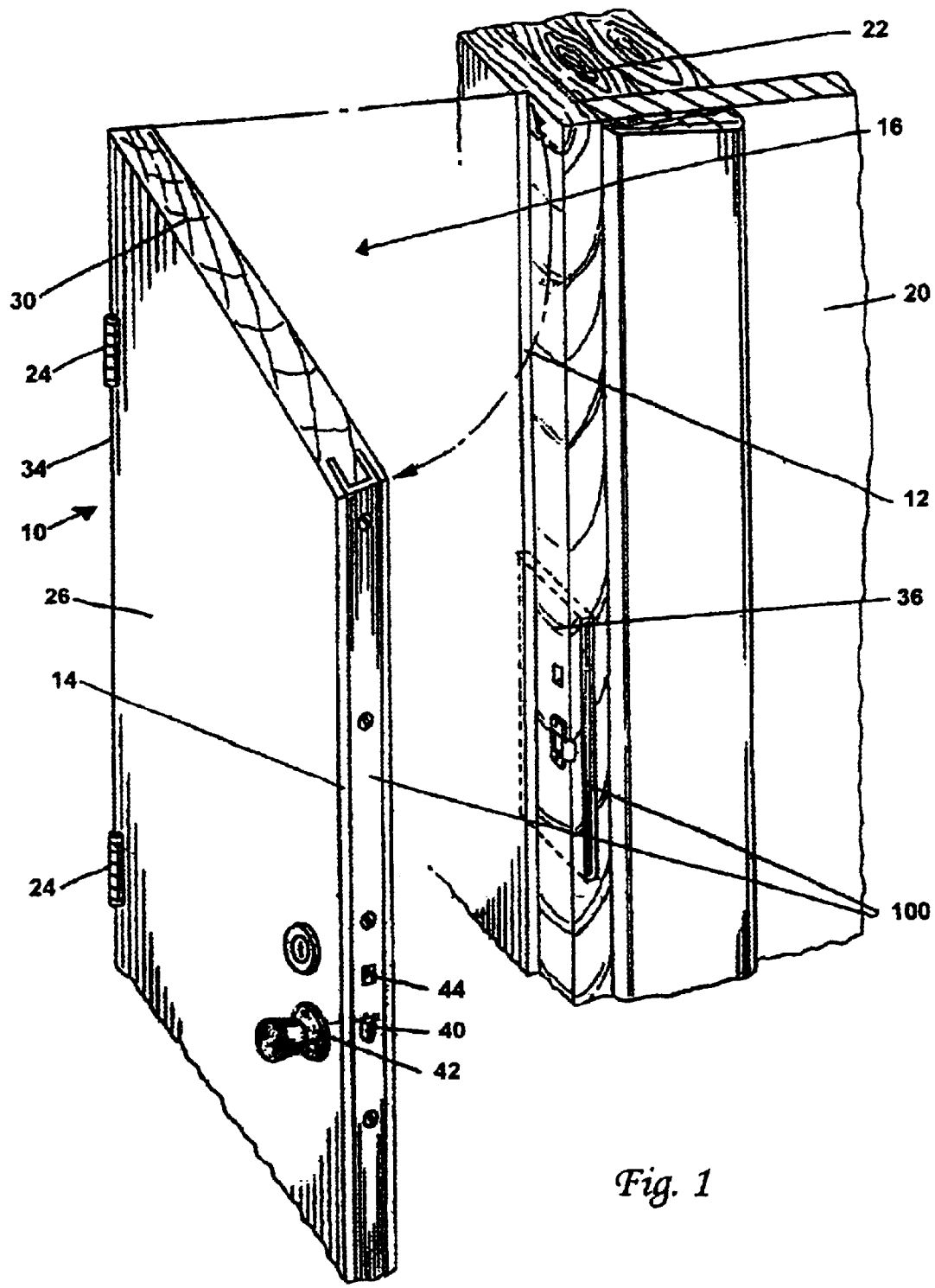
FIG. 1 is a perspective view of a door and door way with the concealed door and door jamb reinforcement assembly installed.

FIGS. 1, 3, and 4 illustrate a door 10 and doorjamb 12 in which the concealed door and doorjamb reinforcement assembly 100 has been fitted in the door's free end 14 and within the doorjamb 12 of the doorway 16. The doorway 16 consists of an opening 18 in a wall 20 having a doorframe 22 constructed within the opening 18. The door 10 is connected to the doorframe 22 on one side by a plurality of hinges 24. The assembly 100 is primarily used in applications where the door 10 is made of wood. However, it is contemplated that the assembly 100 may be used in applications where the door 10 is made of other materials. The doorframe 22 has a doorjamb 12 fixed within the opposite side of the doorframe 22. The door 10 has a front face 26, a back face 28, a top end 30, a bottom end 32, a free end 14 and a hinged end 34.

Figure 6:
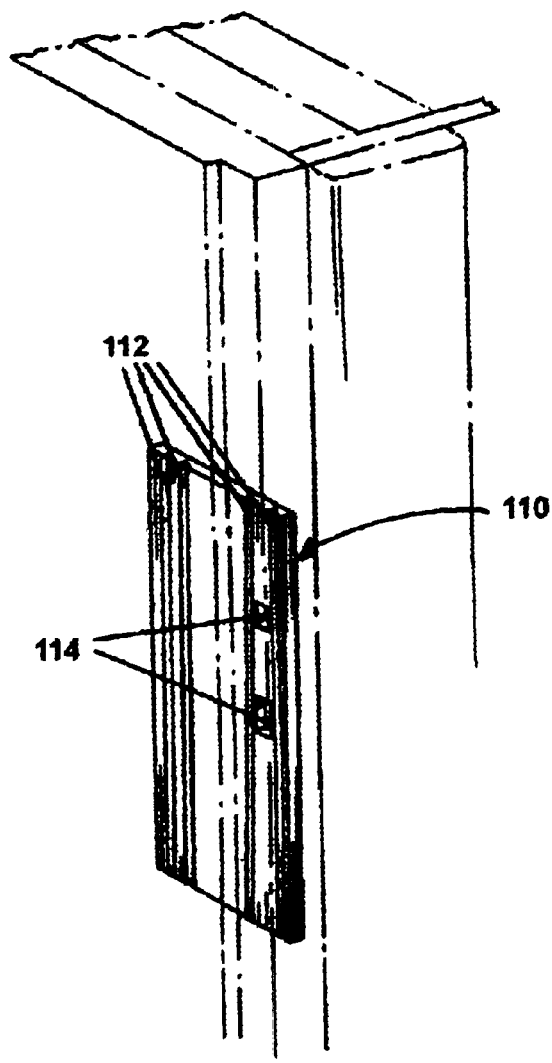
FIG. 6 illustrates the location of the rigid plate between the structural elements of the wall 20 and the doorjamb.
Figure 7:
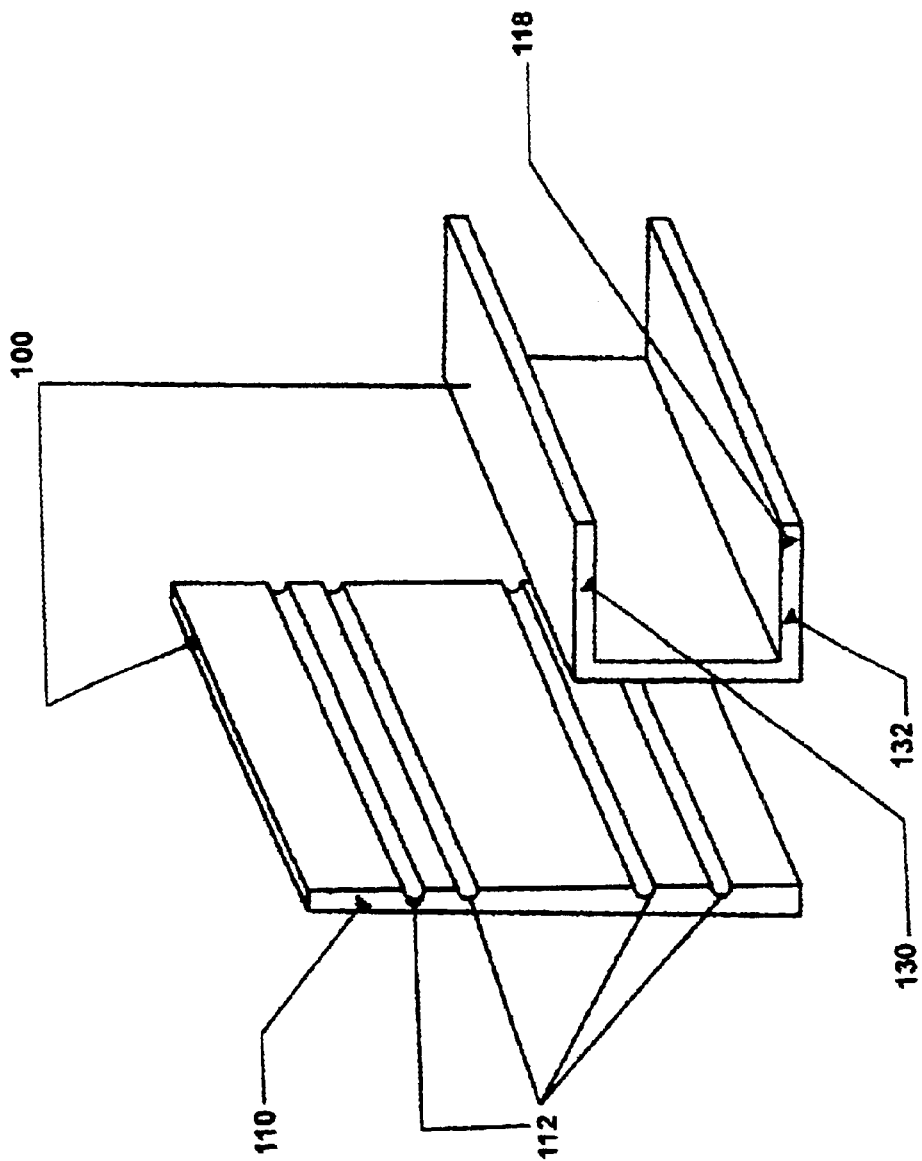
FIG. 7 illustrates the reinforcement plate and U-shaped member of the door jamb reinforcement assembly.

As shown in FIGS. 1, 3, and 6, the doorjamb 12 is reinforced by a rigid plate or spline 110 that if fitted within a pocket 36 of the doorjamb 12. The plate 110 is concealed by the doorjamb so that the plate 110 is not visible when the door 10 is in the closed position. FIGS. 1 and 2 show the pocket 36 is constructed within the doorjamb 12 adjacent the aperture 38 in the doorjamb 12 to provide reinforcement by allowing the latch 40 from the door lock set 42 to be retained by the aperture 114 in the plate and the aperture 38 in the doorjamb 12. This allows the wedge shaped reinforcement plate 110 to be utilized in applications where there is no additional space to be had from the doorframe 22 such as in applications where the wall 20 is constructed from brick. FIG. 7 shows the reinforcement plate 110 as a 12' long aluminum extrusion, tapering from a thickness of 3/16" to a 1/8". During installation of the plate 110, the 12' long extrusion is cut to a length that provides 6" of plate 110 above and below the latch 40 and/or dead bolt 44. In the preferred embodiment, the plate 110 has four flutes 112 long the length of the face of the plate 110 that allow the application of epoxy between the plate 110 and the doorjamb 12. The flutes 112 are 3/16" wide and 1/16" deep. See FIG. 7. The plate 110 has at least one aperture 114 that is aligned with the aperture 38 of the doorjamb 12 to receive the latch 40 from a door lock set 42. In other applications, the plate 110 will have more apertures 114 to accommodate additional latches 40, such as a dead bolt latch 44. The size of the aperture 114 varies depending upon the size of the latch 40 used.

Figure 5:
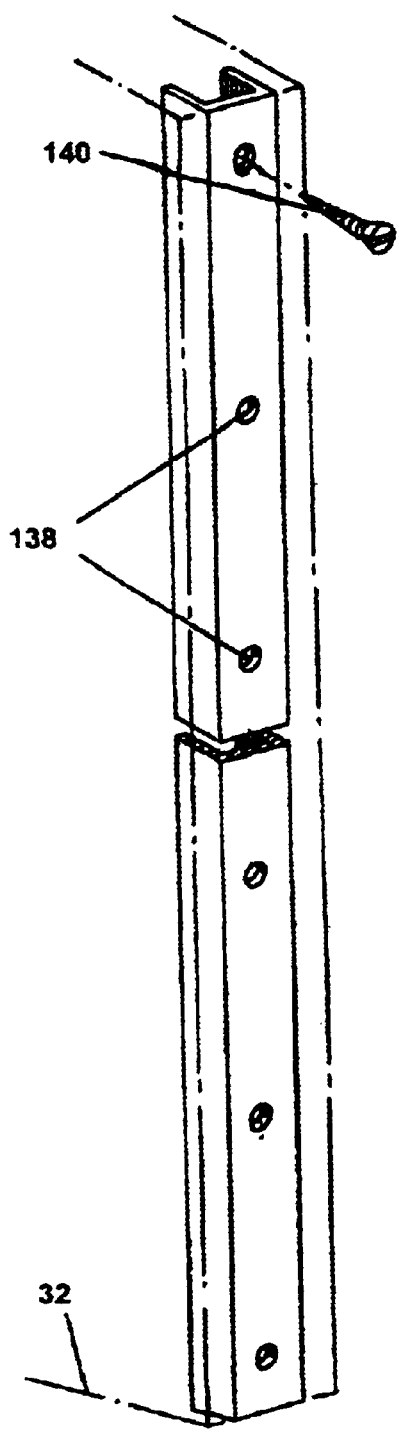
FIG. 5 illustrates the placement of the U shaped member within the door's edge.

As illustrated in FIGS. 1, 4, and 5, the free end 14 of the door 10 has a generally U shaped channel 116 cut into it that is sized and shaped to receive a U shaped reinforcement member 118. The width 120 of the channel 116 is such that the front face 26 and back face 28 of the door 10 conceal the channel 116 from view. Typically, the thickness of the door 10 is 1¾". With this in mind, the channel is cut to a width of 1⅜", allowing 3/16" thickness on either side of the channel 116 for concealment of the U shaped reinforcement member 118. As illustrated in FIG. 2, the channel 116 has two depths. The first depth 122 is cut to accommodate the ⅛" thick U shaped member 118, creating the width 120 of the channel 116. The second depth 124 forms two parallel slots 126 and 128, one at either side of the channel, thus forming the U shaped channel 116 within the free end 14 of the door 10. The second depth 124 is cut to accommodate the arms 130 and 132 of the U shaped member 118.

As illustrated in FIGS. 1, 4, 5 and 7, a U shaped member 118, preferably made of extruded aluminum ⅛" thick, is placed within the U shaped channel 116. FIG. 7 shows the member 118 as a 12' long extrusion. During installation, the 12' long extrusion is cut to fit the length of the door 10. The outer width of the member 118 is approximately 1⅜", with the dimension between arms 130 and 132 being 1⅛". It is important that the distance between arms 130 and 132 be approximately 1⅛" so that the latch 40 and door lock set 42 can fit between arms 130 and 132.

The 1" overall length of arms 130 and 132 is important for two reasons. First, arms 130 and 132 reach into the core of the door 10 to provide the door's edge 48 with reinforcement. Second, the termination of arms 130 and 132 at 1" from the surface of the free end 14 of the door 10 allows the use of the member 118 in a standard door where the hole for the door lock set 42 is cut through the door 10 at 2⅜" from the door's edge 48. FIG. 2 illustrates the arms 130 and 132 of the U shaped member 118 extend within the door 10 to reinforce the door 10 to a point 136 beyond the thickness 46 of the doorjamb 12. This provides the door 10 with increased reinforcement in that during an attempted breaking and entering by way of forcing the door 10 open, the door's edge 48 is less susceptible to giving way because the force is more effectively transferred to other parts of the doorway such as the doorjamb 12, doorframe 22, and wall 20. The U shaped member 118 also has a plurality of holes 138 along the length of the U shaped member 118 for the application of screws 140 to further join the U-shaped member 118 to the door 10.

In another embodiment, the outside of the U shaped member 118 has several flutes along the surface that allow epoxy to be place between the U shaped member 118 and the U shaped channel 116. The epoxy adheres the U shaped member 118 to the door 10 providing reinforcement to the door 10. The epoxy provides a more uniform joining of the U shaped member 118 to the door 10 that produces less localized stress points during an attempted break in.

The invention described above is the preferred embodiment of the present invention. It is not intended that the novel device be limited thereby. The preferred embodiment may be susceptible to modifications and variations that are within the scope and fair meaning of the accompanying claims and drawings.

I claim:

1. A doorway having concealed reinforcement, the doorway comprising:

a wall, the wall having structural elements between the opposing faces of the wall and having an opening sized and shaped for receiving a door frame;

a door frame constructed in the opening of the wall and attached to the structural elements of the wall;

a door jamb attached vertically to and extending the length of one side of the door frame, the door jamb having at least one aperture for receiving a door latch;

a door sized and shaped to fit within the door frame having a front face, a back face, a top end, a bottom end, a free end and a hinged end, the free end having at least one door lock set, the door hingedly connected at the hinged end to the door frame opposite the door jamb, the door being free to swing between an open position and a closed position;

a concealed door and door jamb reinforcement assembly, the assembly comprising:

a vertically displaced pocket within the door jamb to receive a wedge shaped rigid plate, the wedge shaped rigid plate sized and shaped to fit within the pocket of the door jamb so that the plate is concealed from view, the plate having at least one aperture for receiving the latch of the door lock set aligned with the aperture in the door jamb and at least one flute along the face of the length of the plate allowing epoxy to be placed between the plate and the door jamb;

a U shaped channel within and extending along the vertical length of the free end of the door;

a U shaped member sized and shaped to fit within the U shaped channel so that the U shaped member is substantially flush with the surface of the free end of the door and having at least one aperture to allow the latch of the door lock set to pass through the U shaped member, the U shaped member extruded of aluminum and having an overall width from about 1 5/16 inches to about 1 7/16 inches, the distance between arms of the U shaped member being from about 1 1/8 inches to about 1 3/16 inches.

2. The reinforced door assembly of claim 1 wherein the thickness of the wedge shaped rigid plate tapers from 3/16 of an inch to 1/8 of an inch, the tapering facilitating insertion of the plate into the vertically displaced pocket.

3. The reinforced door assembly of claim 2 wherein the door is made of wood and the wedge shaped rigid plate is made of extruded aluminum.

4. A reinforcement assembly for reinforcing a door and door jamb in the vicinity of a door lock aperture in a door frame, the assembly comprising:
- a wedge shaped rigid plate attached to an inner surface of a pocket cut into a door jamb, the plate having at least one aperture for receiving the latch of a door lock set and having at least one flute along the face of the length of the plate allowing epoxy to be placed between the plate and the door jamb;
- a free swinging edge of the door having a vertical U shaped channel cut therein;
- a U shaped member fit within the U shaped channel of the free swinging edge of the door so that the U shaped member is substantially flush with the surface of the free swinging end of the door, the U shaped member extruded of aluminum and having an overall width from about 1 5/16 inches to about 1 7/16 inches, the distance between arms of the U shaped member being from about 1 1/8 inches to about 1 3/16 inches, the U shaped member having at least one aperture to allow the latch of a door lock set to pass through the U shaped member.

5. The reinforcement assembly of claim 4 wherein the arms of the U shaped member are from about 15/16 inch to about 1 1/16 inches in length.

6. The reinforcement assembly of claim 5 wherein the wedge shaped rigid plate is made of extruded aluminum having thickness tapering from about 3/16 inch to about 1/8 inch.

7. A reinforcement assembly in combination with a prefabricated doorway, the combination comprising:
- a door frame having a left post, a right post, a top cross piece, and a bottom cross piece;
- a door jamb attached vertically to and extending the length of one side of the door frame, the door jamb having an outer face and an inner face facing one of said structural elements;
- a door sized and shaped to fit within the door frame having a front face, a back face, a top end, a bottom end, a free end and a hinged end, the door hingedly connected to the door frame opposite the door jamb, the door being free to swing between an open position and a closed position, the door having a U shaped channel within and extending along the vertical length of the free end of the door;
- a wedge shaped rigid plate attached to an inner surface of a pocket cut into the door jamb so that the plate is concealed from view, the plate having at least one aperture for receiving the latch of the door lock set;
- a U shaped member sized and shaped to fit within the U shaped channel so that the U shaped member is substantially flush with the surface of the free end of the door and having at least one aperture to allow the latch of the door lock set to pass through the U shaped member, the U shaped member extruded of aluminum and having an overall width from about 1 5/16 inches to about 1 7/16 inches, the distance between arms of the U shaped member being from about 1 1/8 inches to about 1 3/16 inches.

8. The combination of claim 7 wherein the arms of the U shaped member have sufficient length to extend within the door beyond the thickness of the door jamb when the door is in a closed position.

9. The combination of claim 8 wherein the door is made of wood, the rigid plate is made of extruded aluminum having thickness tapering from about 3/16 inch to about 1/8 inch, and the U shaped member is made of aluminum having thickness of about 1/8 inch.

10. The combination of claim 9 wherein the arms of the U shaped member are from about 15/16 inch to about 1 1/6 inches in length.

11. A door assembly comprising:
- a wall, the wall having structural elements between the opposing faces of the wall and having an opening sized and shaped for receiving a door frame;
- a door frame constructed in the opening of the wall and attached to the structural elements of the wall;
- a door jamb attached vertically to and extending along one side of the door frame, the door jamb having at least one aperture for receiving a door latch;
- a door sized and shaped to fit within the door frame having a front face, a back face, a top end, a bottom end, a free end and a hinged end, the free end having at least one door lock set, the door hingedly connected at the hinged end to the door frame opposite the door jamb, the door being free to swing between an open position and a closed position;
- a door and door jamb reinforcement assembly, the assembly comprising:
  - a vertically displaced pocket within the door jamb to receive a rigid plate;
  - a rigid plate sized and shaped to fit within the pocket of the door jamb, the rigid plate having at least one aperture for receiving the latch of the door lock set aligned with the aperture in the door jamb;
  - a U shaped channel within and extending along at least a portion of a vertical length of the free end of the door;
  - a U shaped member sized and shaped to fit within the U shaped channel so that the U shaped member is substantially flush with the surface of the free end of the door and having at least one aperture to allow the latch of the door lock set to pass through the U shaped member, the U shaped member extruded of aluminum and having an overall width from about 1 5/16 inches to about 1 7/16 inches, the distance between arms of the U shaped member being from about 1 1/8 inches to about 1 3/16 inches.

12. The door assembly of claim 11 wherein the rigid plate is wedge shaped.

13. The door assembly of claim 11 wherein the rigid plate further comprises at least one flute along a face of the rigid plate allowing epoxy to be placed between the rigid plate and the door jamb.

14. The door assembly of claim 11 wherein the rigid plate and the U shaped member are concealed from view.

15. A reinforcement assembly for reinforcing a door and door jamb in the vicinity of a door lock aperture in a door frame, the assembly comprising:
- a rigid plate adapted to be attached to an inner surface of a pocket cut into the door jamb, the plate having at least one aperture for receiving the latch of a door lock set;

a U shaped member adapted to fit within a U shaped channel of a free swinging edge of the door so that the U shaped member is substantially flush with a surface of the free swinging edge of the door, the U shaped member having at least one aperture to allow the latch of a door lock set to pass through the U shaped member and extruded of aluminum having an overall width from about 1 5/16 inches to about 1 7/16 inches, the distance between arms of the U shaped member being from about 1 1/8 inches to about 1 3/16 inches.

16. The reinforcement assembly of claim 15 wherein the U shaped member has at least one flute on the outside of the U shaped member forming a passage between the U shaped member and the U shaped channel.

17. The reinforcement assembly of claim 15 wherein the rigid plate is wedge shaped.

18. A reinforcement assembly in combination with a prefabricated doorway, the combination comprising:

a door frame having a left post, a right post, a top cross piece, and a bottom cross piece;

a door jamb attached vertically to and extending the length of one side of the door frame, the door jamb having an outer face and an inner face facing one of said structural elements;

a door sized and shaped to fit within the door frame having a front face, a back face, a top end, a bottom end, a free end and a hinged end, the door hingedly connected to the door frame opposite the door jamb, the door being free to swing between an open position and a closed position, the door having a U shaped channel within and extending along the vertical length of the free end of the door;

a rigid plate attached to an inner surface of a pocket cut into the door jamb, the plate having at least one aperture for receiving the latch of the door lock set;

a U shaped member sized and shaped to fit within the U shaped channel so that the U shaped member is substantially flush with the surface of the free end of the door and having at least one aperture to allow the latch of the door lock set to pass through the U shaped member, the U shaped member extruded of aluminum and having an overall width from about 1 5/16 inches to about 1 7/16 inches, the distance between arms of the U shaped member being from about 1 1/8 inches to about 1 3/16 inches.

19. The combination of claim 18 wherein the U shaped member further comprises at least two arms having sufficient length to extend within the door beyond the thickness of the door jamb when the door is in a closed position.

20. A method of manufacturing a pre-fabricated doorway having concealed reinforcement, the method comprising:

constructing a door frame having a left post, a right post a top cross piece, and a bottom cross piece;

vertically attaching a door jamb to one side of the door frame;

constructing a door sized and shaped to fit within the door frame having a front face, a back face, a top end, a bottom end, a free end and a hinged end;

hingedly connecting the door to the door frame opposite the door jamb;

cutting a U shaped channel within and extending along the vertical length of the free end of a door;

extruding aluminum into a U shaped member sized and shaped to fit within the U shaped channel having an overall width from about 1 5/16 inches to about 1 7/16 inches, the distance between arms of the U shaped member being from about 1 1/8 inches to about 1 3/16 inches;

inserting the U shaped member within the U shaped channel so that the U shaped member is substantially flush with the surface of the free end of the door;

cutting a vertically displaced pocket within the door jamb to receive a wedge shaped rigid plate;

inserting a wedge shaped rigid plate sized and shaped to fit within the pocket so that the plate is concealed from view, the plate having at least one flute along the face of the length of the plate forming a passage between the plate and the door jamb.

21. A method of manufacturing a pre-fabricated doorway having concealed reinforcement, the method comprising:

constructing a door frame having a left post, a right post a top cross piece, and a bottom cross piece;

vertically attaching a door jamb to one side of the door frame;

constructing a door sized and shaped to fit within the door frame having a front face, a back face, a top end, a bottom end, a free end and a hinged end;

hingedly connecting the door to the door frame opposite the door jamb;

cutting a U shaped channel within and extending along the vertical length of the free end of a door;

extruding aluminum into a U shaped member sized and shaped to fit within the U shaped channel, the U shaped member having an overall width from about 1 5/16 inches to about 1 7/16 inches, the distance between arms of the U shaped member being from about 1 1/8 inches to about 1 3/16 inches;

inserting the U shaped member within the U shaped channel so that the U shaped member is substantially flush with the surface of the free end of the door;

cutting a vertically displaced pocket within the door jamb to receive a rigid plate;

inserting a rigid plate sized and shaped to fit within the pocket.

* * * * *